United States Patent [19]
Cirigliano et al.

[11] Patent Number: 6,120,825
[45] Date of Patent: *Sep. 19, 2000

[54] METHOD FOR THE HYGIENIC PREPARATION, STORAGE, HANDLING AND DISPENSING OF TEA

[75] Inventors: Michael Charles Cirigliano, Cresskill; Mauro Dominick Mordini, Parsippany; Paul John Rothenberg, West Milford; Raymond Thomas McKenna, Scotch Plains, all of N.J.

[73] Assignee: Thomas J. Lipton Co., division of Conopco, Inc., Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,970

[22] Filed: Dec. 20, 1996

Related U.S. Application Data

[60] Provisional application No. 60/020,281, Jun. 19, 1996.

[51] Int. Cl.[7] .............................. A23F 3/34; A23F 3/00; A23P 1/00

[52] U.S. Cl. ..................... 426/435; 426/597; 426/492

[58] Field of Search ..................... 426/597, 435, 426/492

[56] References Cited

U.S. PATENT DOCUMENTS 4,757,752   7/1988   Robins et al. ............................ 99/279

FOREIGN PATENT DOCUMENTS 857517   12/1960   United Kingdom ................... 426/435

*Primary Examiner*—Anthony J. Weier
*Attorney, Agent, or Firm*—James J. Farrell

[57] ABSTRACT

A method for preparing, handling, storing and dispensing tea at relatively mild temperatures is provided to eliminate or substantially reduce microbial outgrowth. A balance between the tea solids concentration and the storage temperature is achieved whereby the delicate flavor of the tea is not compromised.

8 Claims, 3 Drawing Sheets

METHOD FOR THE HYGIENIC PREPARATION, STORAGE, HANDLING AND DISPENSING OF TEA

CROSS-REFERENCE TO RELATED APPLICATION

This application claims the benefit of U.S. Provisional Application No. 60/020,281, filed Jun. 19, 1996.

BACKGROUND OF THE INVENTION

This invention relates to tea products and more specifically to tea concentrates having about 0.2% tea solids to about 40% tea solids which may, in turn, be diluted to prepare ready to drink (RTD) tea beverages.

In the past it was necessary to thoroughly sanitize tea preparative equipment, and to significantly limit storage periods, to minimize bacterial outgrowth in the tea medium. Several types of bacteria as well as yeast and mold have a competitive advantage in certain tea containing beverages.

Tea solids themselves are potent anti-bacterial agents, nevertheless certain organisms can grow in tea held at low tea solids concentrations and low temperatures. This has been especially evident in the food service industry where a lack of hygienic procedures in Ready-to-Drink tea urns has produced very high counts of various bacteria including coliform. The iced tea segment of the food service industry is a relatively large market and employs traditional urn equipment such as that used for preparing coffee. The tea is brewed in the urn and kept at ambient temperatures in large quantities until it is dispensed. The urns themselves and the (tea dispensing) valves must be sanitized on a regular basis to avoid the outgrowth of bacteria. If there is a failure of sanitation especially in obstructed areas such as dispensing valves, large amounts of bacteria can subsequently be found in dispensed beverages. Extremely high temperatures can of course kill bacteria but these high temperatures deleteriously affect the tea flavor profile.

It is thus seen to be desirable to eliminate microbial presence and outgrowth in tea products.

Accordingly, it is an object of the invention to provide a method for brewing, storing and dispensing tea in a manner which minimizes the possibility of microbial contamination.

Yet another object is to minimize or completely eliminate any microbial contamination in tea beverages. While maintaining the delicate flavor balance of the tea beverage.

BRIEF DESCRIPTION OF THE INVENTION

A method for the hygienic preparation, storage, handling and dispensing of fresh brewed tea is disclosed. The brewed tea extract concentrate (for subsequent dilution with cold water to produce the final tea beverage) or the final tea beverage itself, is stored at an elevated temperature to preclude microbiological outgrowth. This significantly improves the cleanability and hygiene of the system. In one embodiment of the invention fresh brewed tea concentrate is brewed in a typical tea autobrewer but diverted for storage to one of several "brew cycle sized" reservoirs which function as an integral element of the system. These reservoirs are capable of maintaining the concentrate at a temperature of from about 110–150° F., with the preferred temperature being about 120–135° F. The fresh brewed tea concentrate may then be dispensed, on demand, into a serving glass, simultaneously with the appropriate amount of cold tap water. A system like the Cornelius post mix dispensing head or the Cornelius syrup flow regulator, or similar device may be employed. In this embodiment the concentrate is cooled and diluted to beverage strength at the serving glass. This embodiment takes advantage of the more microbiologically robust nature of the concentrate, and its increased levels of natural inhibitors, and an elevated storage temperature. The system can also be designed to deliver hot water to the concentrate storage reservoirs and ancillary lines at the end of the day to rinse, clean and sanitize them. A second embodiment of the invention involves storing the already prepared diluted beverage in a storage "urn" capable of maintaining the beverage at the required elevated temperatures. This type of system requires diluting the concentrate with hot water, and dispensing it at elevated temperatures into the serving glass with sufficient ice to bring the beverage to serving temperature. Other cooling methods may also be used to bring the beverage down to serving temperature.

Figure 1:
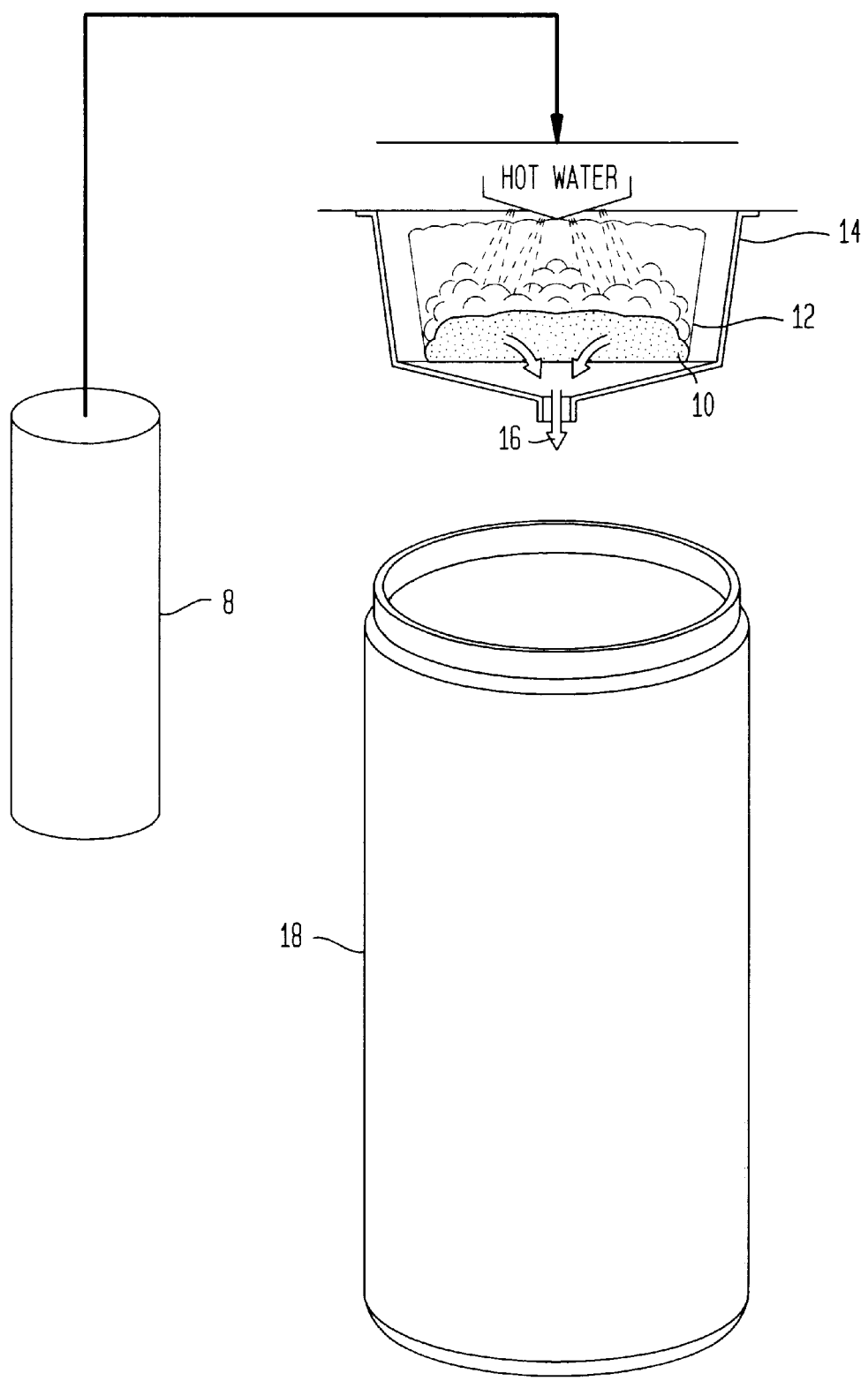
FIG. 1 is a front view of the tea brewing/storage tank.

In operation one embodiment, as shown in FIG. 1, employs loose tea 10 in a filter 12 disposed in a brew cone 14. Hot water from the hot water make up tank 8, preferably at a temperature of 140° F. to 210° F., is introduced by any convenient method into the brew cone 14 and extracts tea solids from the tea 10. The aqueous tea solids are contained in a tea extract 16. Typically this extract 16 contains about 0.05% to about 5% tea solids. The extract is then stored in tea storage tank 18. The size and shape of storage tank 18 may be varied in accordance with desirable design parameters.

Figure 2:
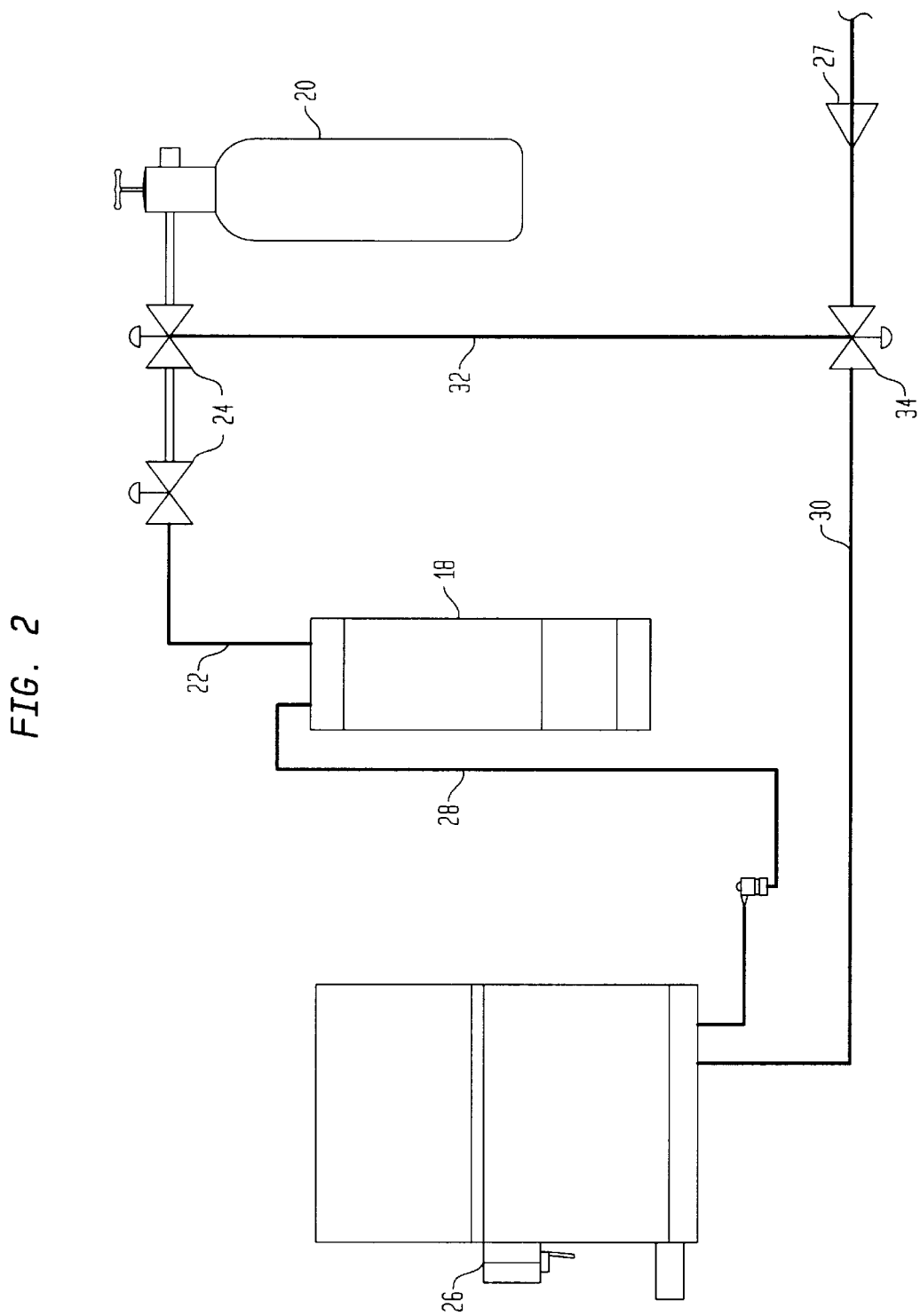
FIG. 2 is a schematic view of a system using the storage tank.

As shown in an embodiment in FIG. 2, the storage tank 18 may be employed in a delivery system for example where gas pressure from a gas tank 20 pressurizes the tea extract in the tank 18 by means of the gas line 22. This gas pressure is controlled by control valves 24 which are responsive to mixing/dispensing valve 26. The pressurized extract or product in tank 18 flows through delivery line 28 to mixing valve 26. In addition, for example gas pressure from the gas tank 20 also optionally pressurizes water preferably at a temperature of 45° F. to 70° F. in the water line 30 by means of gas line 32 which is controlled by control valve 24, and 34 both of which are responsive to mixing valve 26. Check valve 27 prevents cross contamination of the water supply. Although a gas pressure system has been described any system capable of delivering the tea concentrate at desirable temperatures, rates and pressures is applicable e.g. pumps, both positive and negative types would be suitable.

Figure 3:
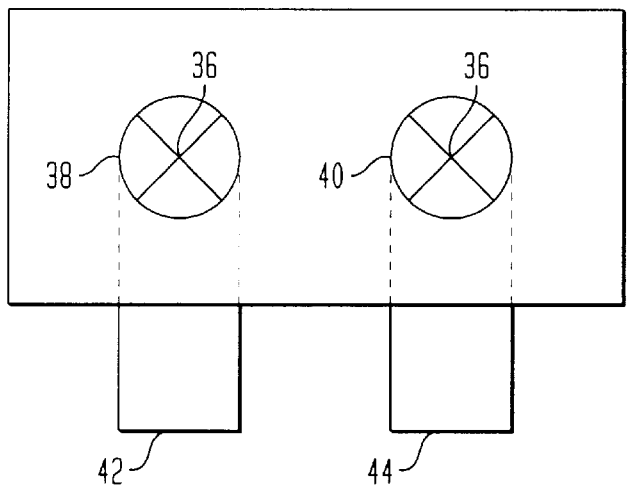
FIGS. 3, 4 and 5 are front, side and top views respectively of a mixing valve that may be used with the system.
Figure 4:
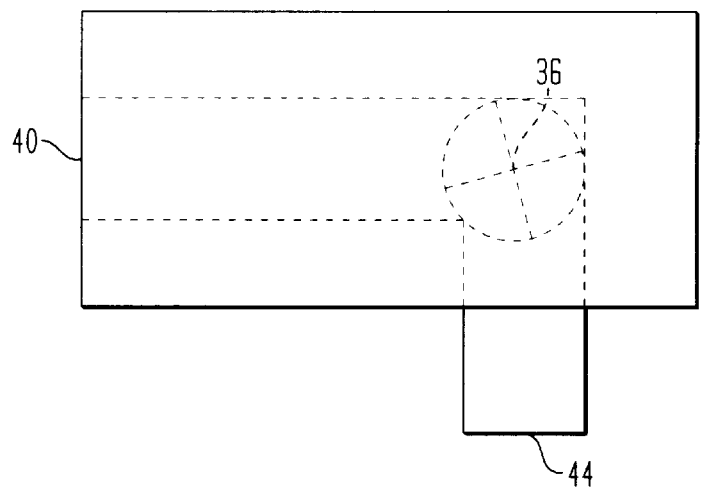
Figure 5:
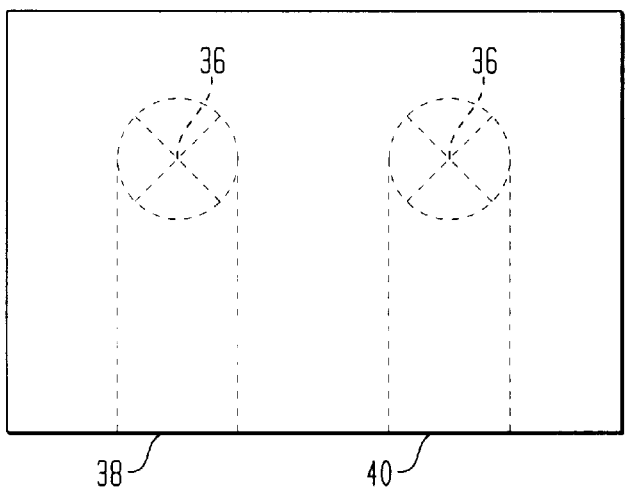

In FIGS. 3, 4 and 5 different views of one embodiment of a mixing/dispensing valve 26 are shown. The tea extract 16 enters the valve 26 through extract inlet 38 in response to sensor/control valve 36. Control valve 36 is responsive to external stimuli or signals such as a switch or the like and is also responsively connected to control valves 24 to pressure the extract 16 and deliver it to mixing valve 26. The extract 16 is then controlled by valve 36 and exits through extract outlet 42. In a similar manner water enters the valve 26 through water inlet 40 in response to sensor/controller valve 36. The control valve 36 is responsive to external stimuli such as a cup trip switch or the like and is also responsively connected to control valves 24 and 34 to optionally pressurize the water and deliver it to mixing/dispensing valve 26.

The water is then controlled by sensor/control valve 36 and exits through water outlet 44. Exits 42 and 44 may be combined if desired by any suitable means such as a funnel enclosure and the like to mix the extract and the water or diluent.

The ratio of extract 16 to water can be varied as desired. In other embodiments as mentioned above the pressure may be supplied by other means on the extract rather than positive gas pressure and the water pressure may be supplied by normal service water pressure in the lines. Many other types of set up are suitable and may be used. The water may be substituted for by an aqueous diluent such as sweetened water and the like.

This invention generally refers to a brewed tea extract which can be maintained free of microbial outgrowth for extended periods provided the tea solids and the holding temperature are balanced. Thus, providing a fresh brewed product without the need for preservatives. Typical fresh tea brewing operations produce an extract of about 0.8 to 1.0% tea solids. In some circumstances this can be considered as a tea concentrate even though there has been no vacuum or other concentration procedure. The normal tea brewing procedure takes the extract and dilutes it with sufficient water to comply with the desired strength to meet consumer preferences. In some areas the extract will be diluted with 2 parts of water while some areas dilute it with 3 parts of water, or even more. Thus the final drinkable beverage will usually have about 0.05% tea solids or more. In the past the tea was extracted by means of a basket and then diluted to a drinkable level in the urn and stored at ambient temperatures at levels of about 0.2% tea solids. For iced tea, the level was sufficiently high so that when ice was added the tea solids concentration of the beverage would not be too low.

The method of the invention can also be used to store tea at higher concentrations up to about 40% for up to about one week or even longer.

Once a tea extract has been obtained by suitable means it may then be concentrated by means well known in the art. Preferably the concentrates are prepared by evaporation under vacuum. The preferred conditions, if evaporation is used, are a temperature of about 115° F. to 195° F. and a pressure of about 1.5 psia to about 10 psia. In this way the extract can be concentrated without having a negative impact on the organoleptic properties of the tea. A commercial concentration rising or falling film evaporator is usually employed. The tea is then concentrated to a level of about 0.8% up to about 40%. It can then be stored according to the invention.

The tea extract can be concentrated to any level which is still fluid enough to be workable but levels of about 0.8% obtained upon single extraction to about 40% obtained by vacuum procedures and preferably about 0.8% to about 5% are preferred for ease of handling.

As used herein, the term "tea concentrate" refers to a product derived from concentrated tea extract which is then diluted with water to form a drinkable tea beverage. Tea concentrates of the present invention comprise from about 0.2 to about 40% tea solids.

As used herein, the term "tea beverage" refers to a drinkable beverage prepared from tea concentrates or extracts by dilution with water. The tea concentrates or extracts are generally diluted with sufficient water to provide the tea beverage. Preferred tea concentrates are typically diluted to a minimum of about 0.08% tea solids and preferably about 0.2% tea solids to provide the tea beverage.

As used herein, the term "tea solids" refer to those solids normally present in a tea extract. Polyphenolic compounds are normally the primary component of tea solids. However, tea solids can also include caffeine, proteins, amino acids, minerals and carbohydrates.

Tea concentrates of varying percentages were prepared and tested at varying temperatures. The concentrates were inoculated with *Klebsiella pneumoniae* bacteria isolated from spoiled fresh brewed tea. The inoculations were carried out at different levels. High being 1,000 organisms per milliliter and low being 10 organisms per milliliter.

EXAMPLE 1

The first series of tests were run on tea extracted at a typical level for an autobrewer, about 0.8% tea solids. The tea was then run in two series of triplicate samples, control versus inoculated samples and each series was run at varying temperatures. The results of standard plate counts per milliliter is reported in Tables 1 through 6 following:

TABLE 1

100° F.

| | HOURS | | | | |
|---|---|---|---|---|---|
| | 0 | 3.5 | 24 | 27.5 | 48 |
| Control A1 | 40 | 50 | <10 | <10 | <10 |
| Control A2 | 50 | 100 | <10 | <10 | <10 |
| Control A3 | 60 | 20 | <10 | <10 | <10 |
| K pneumoniae A1 | 1,100 | 3,000 | 1,480,000 | 5,580,000 | 4,100,000 |
| K pneumoniae A2 | 1,200 | 2,000 | 1,390,000 | 5,445,000 | 9,500,000 |
| K pneumoniae A3 | 1,100 | 2,000 | 1,404,000 | 2,802,000 | 4,200,000 |

TABLE 2

120° F.

| | HOURS | | | | |
|---|---|---|---|---|---|
| | 0 | 3.5 | 24 | 27.5 | 48 |
| Control B1 | <10 | 40 | <10 | 10 | <10 |
| Control B2 | 40 | 40 | <10 | 80 | 20 |
| Control B3 | 70 | 40 | <10 | 80 | <10 |
| K pneumoniae B1 | 1,500 | 2,000 | <10 | 30 | 40 |
| K pneumoniae B2 | 1,500 | 1,300 | <10 | 70 | 20 |
| K pneumoniae B3 | 1,300 | 2,000 | 10 | 40 | <10 |

TABLE 3

120° F.

| | HOURS | | | | |
|---|---|---|---|---|---|
| | 0 | 3.5 | 24 | 27.5 | 48 |
| Control C1 | 30 | 30 | <10 | <10 | 20 |
| Control C2 | 60 | 50 | 10 | 40 | <10 |
| Control C3 | 50 | 50 | <10 | 10 | <10 |
| K pneumoniae C1 | 1,900 | 50 | <10 | 40 | 10 |
| K pneumoniae C2 | 900 | 30 | 10 | 20 | 10 |
| K pneumoniae C3 | 1,100 | 50 | <10 | 40 | 10 |

TABLE 4

130° F.

| | HOURS | | | | |
|---|---|---|---|---|---|
| | 0 | 15 | 30 | 45 | 60 |
| Control A1 | 40 | 20 | 20 | <10 | <10 |
| Control A2 | 10 | 30 | 20 | <10 | <10 |
| Control A3 | 40 | 40 | 20 | <10 | <10 |
| K pneumoniae A1 | 1,500 | 1,100 | 20 | <10 | <10 |

TABLE 4-continued

130° F.

| | HOURS | | | | |
|---|---|---|---|---|---|
| | 0 | 15 | 30 | 45 | 60 |
| K pneumoniae A2 | 2,500 | 700 | 50 | <10 | <10 |
| K pneumoniae A3 | 600 | 1,500 | 50 | <10 | <10 |

TABLE 5

140° F.

| | HOURS | | | | |
|---|---|---|---|---|---|
| | 0 | 15 | 30 | 45 | 60 |
| Control B1 | 20 | 10 | 70 | <10 | <10 |
| Control B2 | 40 | 30 | 50 | <10 | <10 |
| Control B3 | 30 | 10 | 20 | <10 | <10 |
| K pneumoniae B1 | 1,300 | 20 | 18 | <10 | <10 |
| K pneumoniae B2 | 1,400 | 10 | 13 | <10 | <10 |
| K pneumoniae B3 | 2,300 | 60 | 18 | <10 | <10 |

TABLE 6

150° F.

| | HOURS | | | | |
|---|---|---|---|---|---|
| | 0 | 15 | 30 | 45 | 60 |
| Control C1 | 10 | 30 | <10 | <10 | <10 |
| Control C2 | 10 | 30 | <10 | <10 | <10 |
| Control C3 | 30 | 10 | <10 | <10 | <10 |
| K pneumoniae C1 | 1,200 | 40 | <10 | <10 | <10 |
| K pneumoniae C2 | 2,000 | 30 | <10 | <10 | <10 |
| K pneumoniae C3 | 1,200 | 40 | <10 | <10 | <10 |

Clearly, at a temperature of 110° F. and a concentration of 0.8% the *K pneumoniae* was eliminated. Higher concentrations up to about 0.40% or even higher are expected to perform equally well and eliminate bacterial growth.

EXAMPLE 2

Tests similar to those in Example 1 were run but the concentration was reduced to a typical single strength beverage concentration of 0.2% tea solids. Again, the tests were run at varying temperatures and are reported in the following Tables 7 through 9.

TABLE 7

110° F.

| | HOURS | | | | |
|---|---|---|---|---|---|
| | 0 | 17 | 24 | 41 | 48 |
| Control A1 | <10 | <10 | <10 | <10 | <10 |
| Control A2 | <10 | <10 | <10 | <10 | <10 |
| Control A3 | <10 | <10 | <10 | <10 | <10 |
| K pneumoniae A1 | 9,300 | 16,000,000 | 42,000,000 | 17,000,000 | 31,000,000 |
| K pneumoniae A2 | 9,300 | 15,000,000 | 48,000,000 | 25,000,000 | 40,000,000 |
| K pneumoniae A3 | 9,300 | 8,400,000 | 36,000,000 | 23,000,000 | 30,000,000 |

TABLE 8

120° F.

| | HOURS | | | | |
|---|---|---|---|---|---|
| | 0 | 17 | 24 | 41 | 48 |
| Control B1 | <10 | <10 | <10 | <10 | 10 |
| Control B2 | <10 | <10 | <10 | <10 | <10 |
| Control B3 | <10 | <10 | 100 | 10 | 10 |
| K pneumoniae B1 | 9,300 | <10 | <10 | <10 | <10 |
| K pneumoniae B2 | 9,300 | <10 | <10 | <10 | <10 |
| K pneumoniae B3 | 9,300 | <10 | 10 | <10 | <10 |

TABLE 9

130° F.

| | HOURS | | | | |
|---|---|---|---|---|---|
| | 0 | 17 | 24 | 41 | 48 |
| Control C1 | <10 | <10 | <10 | <10 | <10 |
| Control C2 | <10 | <10 | <10 | <10 | <10 |
| Control C3 | <10 | 10 | <10 | <10 | <10 |
| K pneumoniae C1 | 9300 | <10 | <10 | <10 | <10 |
| K pneumoniae C2 | 9300 | <10 | <10 | <10 | <10 |
| K pneumoniae C3 | 9,300 | <10 | <10 | <10 | 10 |

The results show some growth at 110° F. but at 120° F. the bacteria was eliminated.

EXAMPLE 3

Tests were run similar to Example 1 but the tea solids were about ½ of typical autobrew concentrations at 0.45% tea solids. The results are reported in Tables 10 through 12 following.

TABLE 10

110° F.

| | HOURS | | | | |
|---|---|---|---|---|---|
| | 0 | 17 | 24 | 41 | 48 |
| Control A1 | <10 | <10 | <10 | <10 | <10 |
| Control A2 | <10 | <10 | <10 | <10 | <10 |
| Control A3 | <10 | <10 | <10 | <10 | <10 |
| K pneumoniae A1 | 1,000 | 150 | 20 | <10 | <10 |
| K pneumoniae A2 | 1,000 | 90 | <10 | <10 | <10 |
| K pneumoniae A3 | 1,000 | 100 | 150 | 4,100 | 4,200 |

TABLE 11

120° F.

| | HOURS | | | | |
|---|---|---|---|---|---|
| | 0 | 17 | 24 | 41 | 48 |
| Control B1 | <10 | <10 | <10 | <10 | <10 |
| Control B2 | <10 | <10 | <10 | <10 | <10 |
| Control B3 | <10 | <10 | <10 | <10 | <10 |
| K pneumoniae B1 | 1,000 | <10 | <10 | <10 | <10 |
| K pneumoniae B2 | 1,000 | <10 | <10 | <10 | <10 |
| K pneumoniae B3 | 1,000 | <10 | <10 | <10 | <10 |

TABLE 12

130° F.

| | HOURS | | | | |
|---|---|---|---|---|---|
| | 0 | 17 | 24 | 41 | 48 |
| Control C1 | <10 | <10 | <10 | <10 | <10 |
| Control C2 | <10 | <10 | 20 | <10 | <10 |
| Control C3 | <10 | <10 | <10 | <10 | <10 |
| K pneumoniae C1 | 1,000 | <10 | <10 | <10 | <10 |
| K pneumoniae C2 | 1,000 | <10 | <10 | <10 | <10 |
| K pneumoniae C3 | 1,000 | <10 | <10 | <10 | <10 |

The results show that increased concentration of 0.45 eliminates the bacteria at 110° F.

EXAMPLE 4

Another test was run on a second typical autobrewer concentration of 0.86%. The tests were the same as Example 1. The results are reported in Tables 13 through 15 following:

TABLE 13

110° F.

| | HOURS | | | | |
|---|---|---|---|---|---|
| | 0 | 17 | 24 | 41 | 48 |
| Control A1 | <10 | <10 | <10 | <10 | <10 |
| Control A2 | <10 | <10 | <10 | 40 | <10 |
| Control A3 | <10 | <10 | <10 | 370 | 40 |
| K pneumoniae A1 | 930 | 200 | 90 | 2,700 | 2,900 |
| K pneumoniae A2 | 930 | 240 | <10 | <10 | <10 |
| K pneumoniae A3 | 930 | 4,700 | 3,800 | <10 | <10 |

TABLE 14

120° F.

| | HOURS | | | | |
|---|---|---|---|---|---|
| | 0 | 17 | 24 | 41 | 48 |
| Control B1 | <10 | <10 | <10 | <10 | <10 |
| Control B2 | <10 | <10 | <10 | <10 | <10 |
| Control B3 | <10 | <10 | <10 | <10 | <10 |
| K pneumoniae B1 | 930 | <10 | <10 | <10 | <10 |
| K pneumoniae B2 | 930 | <10 | <10 | <10 | <10 |
| K pneumoniae B3 | 930 | <10 | 10 | <10 | <10 |

TABLE 15

130° F.

| | HOURS | | | | |
|---|---|---|---|---|---|
| | 0 | 17 | 24 | 41 | 48 |
| Control C1 | <10 | <10 | 10 | <10 | <10 |
| Control C2 | <10 | <10 | <10 | <10 | <10 |
| Control C3 | <10 | <10 | <10 | <10 | <10 |
| K pneumoniae C1 | 930 | <10 | <10 | <10 | <10 |
| K pneumoniae C2 | 930 | <10 | <10 | <10 | <10 |
| K pneumoniae C3 | 930 | <10 | <10 | <10 | <10 |

The results show a slight growth at the beginning of one sample but this is eliminated after about 40 hours.

Although the invention has been described in detail with respect to preferred embodiments thereof, variations and modifications will be readily apparent to those skilled in the art without departing from the spirit and scope of the invention as set forth in the claims.

What is claimed is:

1. A method for storing, handling and dispensing tea containing at least about 0.05% to about 40% tea solids comprising:
    preparing a tea extract containing about 0.05% to about 5% tea solids by aqueous extraction;
    concentrating the tea extract under vacuum to a level from about 0.8% to about 40% tea solids to prepare a tea concentrate;
    raising the temperature of the extract or the concentrate to about 110° F. to about 150° F.;
    storing the heated extract or concentrate at a temperature of about 110° F. to 150° F. for at least about 10 days;
    diluting the stored concentrate to prepare a ready to drink tea beverage of about 0.06% to about 0.3% tea solids.

2. A method as defined in claim 1 wherein the temperature is raised to about 120° F. to about 150° F.

3. A method as defined in claim 1 wherein the temperature is raised to about 130° F. to about 150° F.

4. A method as defined in claim 1 wherein said extract has a tea solids content of about 0.1 to about 1.0%.

5. A method as defined in claim 1 wherein said concentrate has a tea solids content of about 1.0% to about 0.40%.

6. A method for the hygienic preparation, storage, handling and dispensing of tea comprising:
    (a) extracting fresh leaf tea with hot water at a temperature of 140° F. to 210° F. to prepare a tea extract containing about 0.05% to about 3.5% tea solids;
    (b) holding for a period up to 10 days, the tea extract, at a temperature of 110° F. to 150° F. to prepare a microbiologically stable tempered tea extract;

(c) delivering the tempered tea extract to a mixing/dispensing valve in response to a demand signal from the valve;

(d) delivering an aqueous diluent substantially simultaneously to said mixing/dispensing valve in response to the same demand signal from step (c);

(e) delivering the tea extract and aqueous diluent from the mixing/dispensing valve to an appropriate receptacle.

7. A method for eliminating microbiological contamination in stored tea concentrate for at least about ten days comprising:

preparing a tea extract containing about 0.05 to about 5% tea solids by aqueous extraction;

further optionally concentrating the tea extract to a concentration of about 0.8% to about 0.40% tea solids to prepare a tea concentrate;

raising the temperature of the concentrate to about 110° F. to about 150° F. to form a heated concentrate;

storing the heated concentrate at a temperature of 110° F. to 150° F. for up to about 10 days.

8. A method as defined in claim 7 wherein said concentrate has a tea solids content of about 1% to about 0.40%.

* * * * *